US011763518B2

(12) United States Patent
Skotheim et al.

(10) Patent No.: US 11,763,518 B2
(45) Date of Patent: Sep. 19, 2023

(54) METHOD AND SYSTEM FOR GENERATING A THREE-DIMENSIONAL IMAGE OF AN OBJECT

(71) Applicant: Zivid AS, Oslo (NO)

(72) Inventors: Øystein Skotheim, Trondheim (NO); Henrik Schumann-Olsen, Oslo (NO)

(73) Assignee: Zivid AS, Oslo (NO)

( * ) Notice: Subject to any disclaimer, the term of this patent is extended or adjusted under 35 U.S.C. 154(b) by 0 days.

(21) Appl. No.: 16/956,191

(22) PCT Filed: Nov. 26, 2018

(86) PCT No.: PCT/EP2018/082614
§ 371 (c)(1),
(2) Date: Jun. 19, 2020

(87) PCT Pub. No.: WO2019/120896
PCT Pub. Date: Jun. 27, 2019

(65) Prior Publication Data
US 2020/0334895 A1    Oct. 22, 2020

(30) Foreign Application Priority Data
Dec. 22, 2017  (GB) .................................... 1721819

(51) Int. Cl.
*G06T 15/20*      (2011.01)
*G06T 17/20*      (2006.01)
*G06T 7/521*      (2017.01)
(52) U.S. Cl.
CPC ............ *G06T 15/205* (2013.01); *G06T 7/521* (2017.01); *G06T 17/205* (2013.01); *G06T 2207/10028* (2013.01)

(58) Field of Classification Search
None
See application file for complete search history.

(56) References Cited

U.S. PATENT DOCUMENTS 6,751,344 B1    6/2004   Grumbine
9,787,899 B1 *  10/2017  Hinkel ................ G02B 27/646
(Continued)

OTHER PUBLICATIONS

PCT International Search Report and Written Opinion for corresponding PCT Application No. PCT/EP2018/082614, dated Feb. 12, 2019, 9 pages.

*Primary Examiner* — Tize Ma
(74) *Attorney, Agent, or Firm* — Dority & Manning, P.A.

(57) ABSTRACT

A method for generating a three-dimensional image of an object, comprising receiving a set of input point cloud data from an imaging system, the set of input point cloud data comprising two or more input point clouds, determining, for each point in the respective input point clouds, a value of a quality parameter that reflects a degree of uncertainty in the three dimensional coordinates as specified for that point, generating an output point cloud for generating a three-dimensional representation of the object surface, wherein, for each point in the output point cloud, the coordinates of the respective point are computed based on the coordinate values of the points in the input point clouds, wherein the extent to which the coordinate values in the respective input point clouds are taken into consideration in the computation is determined based on the values of the quality parameter associated with those respective points.

17 Claims, 8 Drawing Sheets

(56) References Cited

U.S. PATENT DOCUMENTS

| | | | |
|---|---|---|---|
| 2015/0022693 A1* | 1/2015 | Appia | G06T 5/50 |
| | | | 348/239 |
| 2017/0004649 A1 | 1/2017 | Romea et al. | |
| 2017/0289515 A1 | 10/2017 | Li et al. | |
| 2018/0130224 A1* | 5/2018 | Hoelscher | G06T 17/20 |
| 2018/0130255 A1* | 5/2018 | Hazeghi | H04N 13/239 |
| 2019/0035150 A1* | 1/2019 | Owechko | G01B 11/24 |

* cited by examiner

METHOD AND SYSTEM FOR GENERATING A THREE-DIMENSIONAL IMAGE OF AN OBJECT

FIELD

Embodiments described herein relate to a method and system for generating a three-dimensional image of an object.

BACKGROUND

Three-dimensional surface imaging (3D surface imaging) is a fast growing field of technology. The term "3D surface imaging" as used herein can be understood to refer to the process of generating a 3D representation of the surface(s) of an object by capturing spatial information in all three dimensions—in other words, by capturing depth information in addition to the two-dimensional spatial information present in a conventional image or photograph. This 3D representation can be visually displayed as a "3D image" on a screen, for example.

A number of different techniques can be used to obtain the data required to generate a 3D image of an object's surface. These techniques include, but are not limited to, structured light illumination, time of flight imaging, holographic techniques, stereo systems (both active and passive) and laser line triangulation. In each case, the data may be captured in the form of a "point cloud", in which intensity values are recorded for different points in three-dimensional space, with each point in the cloud having its own set of (x, y, z) coordinates and an associated intensity value I.

Figure 1:
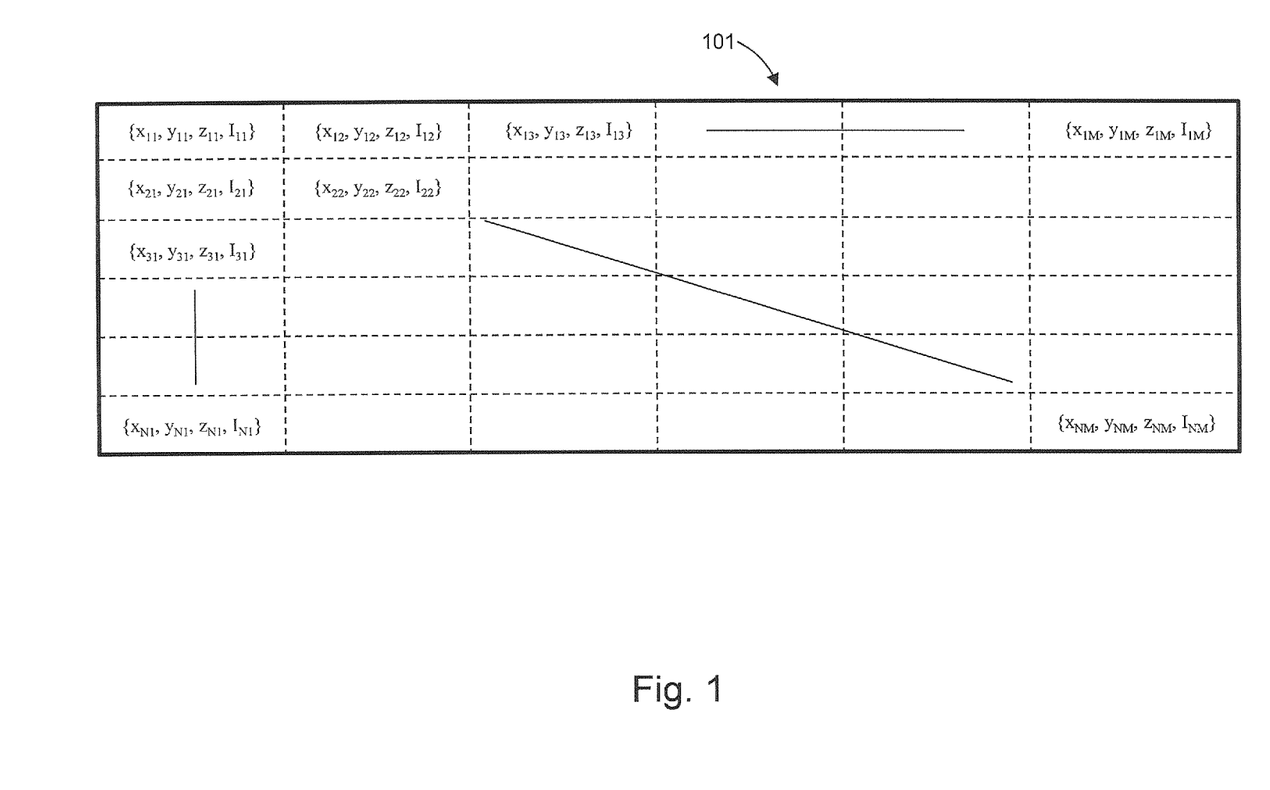
FIG. 1 shows an example of a conventional point cloud matrix.

FIG. 1 shows an example of how the data in the point cloud may be stored in memory. As shown, the data is stored in the form of a two-dimensional point cloud matrix 101 having N rows and M columns. Each element in the matrix comprises a data tuple that includes an $\{x_{ij}\ y_{ij},\ z_{ij}\}$ coordinate for a point in the cloud, where $i=\{1, 2 \ldots N\}$, $j=\{1, 2, \ldots M\}$ and N and M are integer values. The data tuple also includes an intensity value $I_{ij}$ for that point. The intensity values and their respective spatial coordinates together define the geometry of the external surfaces of the object under consideration. The points can be rendered in three dimensions so as to provide a 3D representation of the object.

In some cases, the point cloud data may be computed from one or more two-dimensional images of the object as acquired using a 2D sensor array. In such cases, the elements in the point cloud matrix may be mapped to pixel elements in the sensor array. For example, for a given matrix element, the i and j indices may indicate the position of the respective pixel element in the sensor array. The $\{x_{ij}\ y_{ij},\ z_{ij}\}$ coordinates may then define the position in space of a point as seen in that pixel in one or more of the two-dimensional images.

As with all forms of imaging, the signal-to-noise ratio (SNR) in the final 3D image will be determined in part by the dynamic range of the sensor used to capture the image data. If the signal strength received from different points on the object is likely to vary considerably—because the object's surface contains a number of very bright and very dark regions, for example—then a balance must be struck between (i) maximizing the illumination intensity and/or sensor exposure time so as to ensure sufficient light is received from the darker regions of the object, and (ii) minimizing the illumination intensity and/or sensor exposure time to avoid saturating the sensor with signal from the brighter regions of the object. In order to address this problem, one proposed solution is to apply the concept of High Dynamic Range (HDR) Imaging to 3D imaging. High Dynamic Range Imaging (HDR) is an established technique for increasing dynamic range in light levels seen in digital images. The technique comprises capturing several images of the same scene with different exposure times, and post-processing the data from the images to produce a single HDR image of the scene. The images captured at longer exposure times permit capture of detail in darker areas of the scene, which cannot be discerned in images captured at shorter exposure times due to insufficient signal reaching the camera. The images captured at shorter exposure times meanwhile permit capture of detail in brighter areas of the scene, which cannot be discerned in the images captured at longer exposure times due to camera saturation. By post-processing these images using a suitable HDR algorithm, it is possible to obtain a single, high definition image in which the elements of detail are visible across both light and dark regions of the image.

Figure 2:
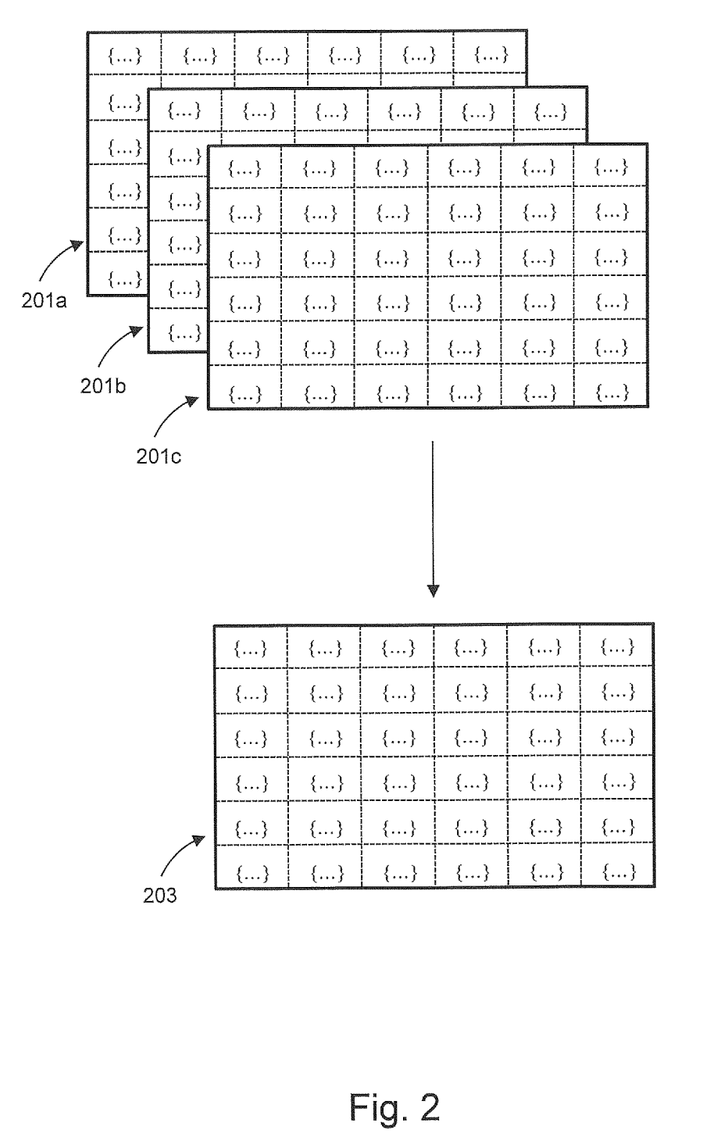
FIG. 2 shows an illustration of how multiple point cloud matrices may be merged or combined to form a single point cloud matrix.

The principles of HDR imaging are, broadly speaking, applicable to 3D imaging in the same way as conventional 2D imaging. FIG. 2 shows, schematically, an example of how this might be implemented. In a similar fashion to 2D HDR imaging, multiple image data sets can be captured with different exposure settings, but in this case, the image data sets comprise 3D image data, rather than 2D image data, i.e. the image data sets specify the three-dimensional positions of points in the scene being looked at. Each image data set can be stored in the form of a respective point cloud matrix 201a, 201b, 201c. The point cloud matrices can then be merged into a single point cloud matrix 203 from which the 3D HDR image can be rendered. 3D HDR imaging does, however, pose additional challenges compared to 2D HDR imaging. One problem is that, in contrast to 2D imaging, an additional step of computation is required in order to obtain the three-dimensional coordinates of each point; the effect of any shortfall in SNR in the acquired image data may be compounded by this additional computation, significantly influencing the accuracy with which the 3D coordinates of each point in the output image are calculated.

It follows that there is a need to provide improved techniques generating 3D HDR images.

SUMMARY

According to a first aspect of the present invention, there is provided a method for generating a three-dimensional image of an object, the method comprising:

receiving a set of input point cloud data from an imaging system used to image the object, wherein the set of input point cloud data comprises two or more point clouds, each point cloud defining the three-dimensional coordinates of points on the surface of the object, wherein the data in each input point cloud is computed from a respective set of image data acquired by the imaging system, each set of image data being acquired using a different exposure setting for the imaging system;

determining, for each point in the respective input point clouds, a value of a quality parameter, wherein the value of the quality parameter for a respective point reflects a degree of uncertainty in the three dimensional coordinates as specified for that point in the point cloud;

identifying groups of points from the set of input point cloud data, wherein each group comprises a point from each input point cloud;

generating an output point cloud for generating a 3D representation of the object surface, wherein the output point cloud defines the three-dimensional coordinates of points on the surface of the object, wherein, for each point in the output point cloud, the coordinates of the respective point are computed based on the coordinate values of the points in a respective one of the identified groups of points, wherein the extent to which the coordinate values of each respective point in the group are taken into consideration in the computation is determined based on the values of the quality parameter associated with the respective point;

the method comprising rendering a three-dimensional image of the object based on the data in the output point cloud.

The imaging system may be an optical imaging system comprising a light sensor. The data in each input point cloud may be computed from one or more 2D images of the object as captured on the light sensor.

The exposure setting used to acquire each set of image data may be varied by altering one or more of:
  the sensor integration time;
  the sensor sensitivity;
  the size of an aperture stop in the path between the object and the sensor;
  an intensity of light used to illuminate the object; and
  the strength of an ND filter placed in the light path between the object and the sensor.

The data in each input point cloud may be stored as a respective two dimensional point cloud matrix. Each element in the matrix may contain the three-dimensional coordinates of a respective point, the intensity value for the point, and the value of the quality parameter for that point. The points in each group may be identified as ones having the same element position in the respective input point cloud matrices. The sensor may comprise a two dimensional pixel array. The matrix elements may be mapped to respective pixel elements in the array.

The imaging system may be one that uses structured illumination to obtain each set of image data.

Each set of image data may comprise a sequence of 2D images of the object as captured on the sensor. Each 2D image in the sequence may be captured using a different illumination pattern. The images in the sequence may be used to compute the input point cloud matrix for the respective exposure setting.

For each input point cloud matrix, the quality parameter for each element in the input point cloud matrix may comprise a measure of contrast seen in the corresponding pixel across the sequence of images.

For each input point cloud matrix, the quality parameter for each element in the input cloud matrix may be computed based on the standard deviation in intensity seen in the corresponding pixel across the sequence of images.

For each input point cloud matrix, the quality parameter for each element in the input cloud matrix may be computed based on the difference between the maximum and minimum brightness in intensity seen in the corresponding pixel across the sequence of images.

For each input point cloud matrix, the quality parameter for each element in the input cloud matrix may be computed based on a modelled error in the 3D coordinates at that point. The error may be modelled as a function of the intensity seen in the corresponding pixel across the sequence of images.

Each set of image data may comprise a sequence of Gray-coded images and a sequence of phase shifted images. The data from the sequence of Gray-coded images and phase shifted images may be combined to derive, for each pixel element, a value from which the coordinates of a respective point in the point cloud are computed. The error in the coordinates at each point in the point cloud may be modelled as a function of the error in the value computed for the respective pixel element.

Each input point cloud may comprise colour information for each point. The colour information may be encoded as RGB values.

According to a second aspect of the present invention, there is provided a computer readable storage medium comprising computer executable code that when executed by a computer will cause the computer to carry out a method according to the first aspect of the present invention.

According to a third aspect of the present invention, there is provided a system for generating a three-dimensional image of an object, the system comprising:
  a sensor for acquiring image data from the object;
  a controller for varying the exposure of the sensor, the sensor being configured to acquire respective sets of image data at different exposures; and
  a processor for processing the acquired image data, wherein for each set of image data, the processor is configured to generate an input point cloud, the point cloud defining the three-dimensional coordinates of points on the surface of the object and an intensity value at each point,
  the processor being further configured to:
    determine, for each point in the respective input point clouds, a value of a quality parameter, wherein the value of the quality parameter for a respective point reflects a degree of certainty in the three dimensional coordinates as specified for that point in the point cloud;
    identify groups of points from the set of input point cloud data, wherein each group comprises a point from each input point cloud; and
    generate an output point cloud for generating a 3D representation of the object surface, wherein the output point cloud defines the three-dimensional coordinates of points on the surface of the object and an intensity value at each point,
    wherein, for each point in the output point cloud, the coordinates of the respective point are computed based on the coordinate values of the points in a respective one of the identified groups of points, wherein the extent to which three coordinate values of each respective point in the group are taken into consideration in the computation is determined based on the values of the quality parameter associated with the respective point, and
    to render a three-dimensional image of the object based on the data in the output point cloud.

The imaging system may be an optical imaging system. The sensor may be a light sensor. The data in each input point cloud may be computed from one or more 2D images of the object as captured on the light sensor.

The controller may be configured to vary the exposure by altering one or more of:
  the sensor integration time;
  the sensor sensitivity;
  the size of an aperture stop in the path between the object and the sensor;
  an intensity of light used to illuminate the object; and
  the strength of an ND filter placed in the light path between the object and the sensor.

The data in each input point cloud may be stored as a respective two dimensional point cloud matrix. Each element in the matrix may contain the three-dimensional coordinates of a respective point, the intensity value for the point, and the value of the quality parameter for that point. The points in each group may be identified as ones having the same element position in the respective input point cloud matrices.

The light sensor may comprise a two dimensional pixel array. The matrix elements may be mapped to respective pixel elements in the array.

The imaging system may be one that uses structured illumination to obtain each set of image data.

Each set of image data may comprise a sequence of 2D images of the object as captured on the light sensor. Each 2D image in the sequence may be captured using a different illumination pattern. The images in the sequence may be used to compute the input point cloud matrix for the respective exposure setting.

For each input point cloud matrix, the quality parameter for each element in the input point cloud matrix may comprise a measure of contrast seen in the corresponding pixel across the sequence of images.

For each input point cloud matrix, the quality parameter for each element in the input cloud matrix may be computed based on the standard deviation in intensity seen in the corresponding pixel across the sequence of images.

For each input point cloud matrix, the quality parameter for each element in the input cloud matrix may be computed based on the difference between the maximum and minimum brightness in intensity seen in the corresponding pixel across the sequence of images.

For each input point cloud matrix, the quality parameter for each element in the input cloud matrix may be computed based on a modelled error in the 3D coordinates at that point. The error may be modelled as a function of the intensity seen in the corresponding pixel across the sequence of images. Each set of image data may comprise a sequence of Gray-coded images and a sequence of phase shifted images. The system may be configured to combine the data from the sequence of Gray-coded images and phase shifted images to derive, for each pixel element, a value from which the coordinates of a respective point in the point cloud are computed. The error in the coordinates at each point in the point cloud may be modelled as a function of the error in the value computed for the respective pixel element.

The sensor may be a colour image sensor. Each input point cloud may comprise colour information for each point. The colour information may be encoded as RGB values.

Embodiments described herein provide a means for obtaining 3D HDR images of an object. A 3D HDR image is obtained by capturing multiple sets of image data. The image data may be obtained using one of several techniques known in the art; these techniques may include, for example, structured light illumination, time of flight imaging and holographic techniques, as well as stereo imaging (both active and passive) and laser line triangulation. Each set of image data can be used to compute a respective input point cloud that specifies the three-dimensional coordinates of points on the object surface and their intensities. The information in each point cloud can then be combined or merged in such a way as to provide a single output point cloud, from which a 3D image of the object can be rendered.

Importantly, the sets of image data used to compute each respective input point cloud matrix are acquired with different exposure settings, such that the exposure of the imaging system differs for each set of image data. Here, an "exposure setting" refers to a physical parameter of the imaging system that can be adjusted in order to vary the exposure of the system. In the case where an optical imaging system is being used, the settings that are varied in-between capturing each set of image data may include, for example, the integration time of the camera/light sensor, the size of the camera/light sensor aperture, the intensity of light used to illuminate the scene or object, and the sensitivity of the camera or light sensor. The sensitivity of the camera or light sensor may be varied by adjusting the gain applied to the device, for example. In another example, a neutral density filter may be placed in the light path between the object and the camera/light sensor. The strength of the neutral density filter may then be altered each time a new set of image data is acquired, so as to vary the amount of light reaching the camera or light sensor.

In some embodiments, only one of the exposure settings may be varied for each exposure, with the other exposure settings remaining constant each time a new set of image data is acquired. In other embodiments, two or more of the settings may be varied in-between capturing each new set of image data.

Where the image data is acquired with a greater exposure, this will maximize the signal that is detected from darker regions of the object or scene. The SNR for points in the darker regions can thereby be increased, allowing the spatial coordinates of those points to be computed with greater accuracy when compiling a point cloud from that set of image data. Conversely, adjusting the exposure settings in such a way as to reduce the exposure makes it possible to maximize the signal that is captured from brighter regions of the object or scene without the camera or light sensor becoming saturated; thus, by reducing the exposure, it is possible to obtain a second set of image data in which the SNR for points in the brighter regions can be increased. In turn, it becomes possible to generate a second point cloud in which the spatial coordinates of points in those brighter regions can be computed with greater accuracy. The data from these different point clouds can then be combined in such a way as to ensure that the SNR in the output 3D image is enhanced for both the brighter and darker regions of the object.

Figure 3:
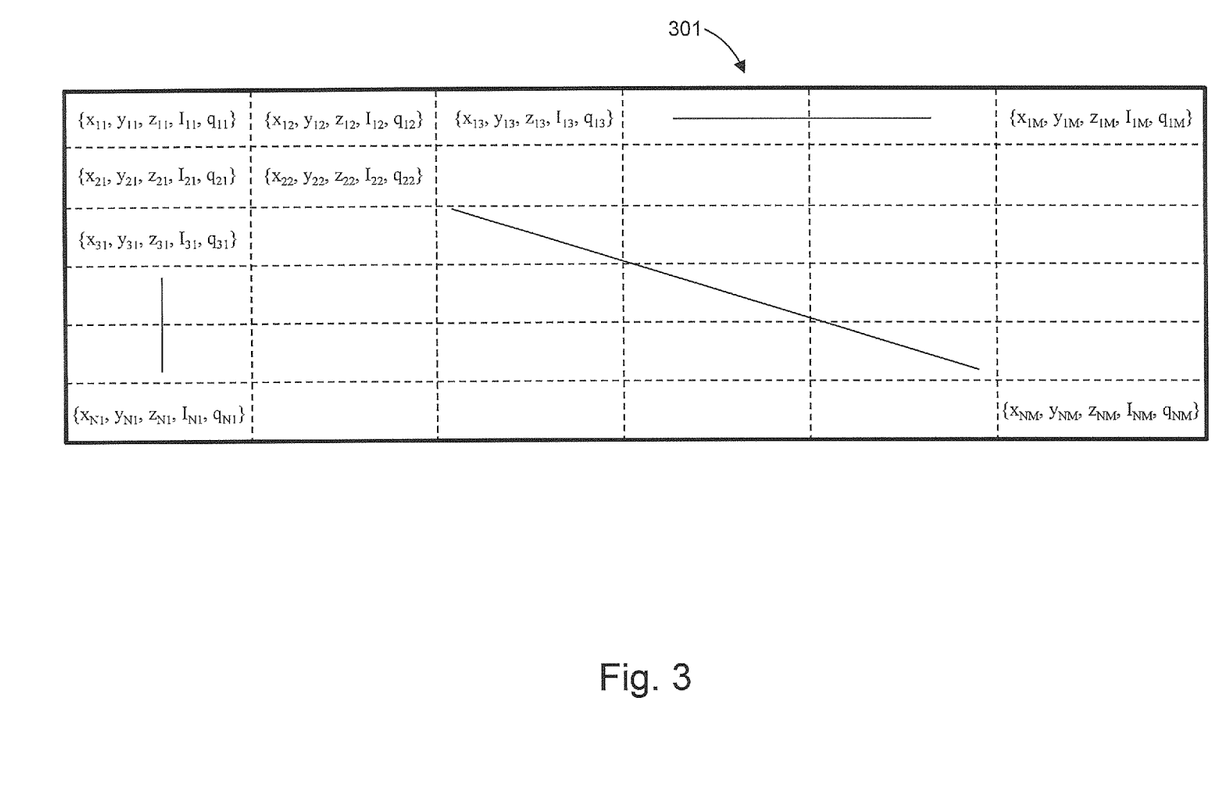
FIG. 3 shows an example of a point cloud matrix in an embodiment described herein.

In order to determine how best to combine the data from the respective point clouds, in embodiments described herein, an additional "quality parameter" is evaluated for each point in each set of image data. FIG. 3 shows an example of a point cloud matrix 301 as used in an embodiment. In contrast to the conventional point cloud matrix of FIG. 1, each element of the point cloud matrix in FIG. 3 includes an additional value $q_{ij}$. The value of the quality parameter $q_{ij}$ reflects the degree of uncertainty in the $\{x_{ij}, y_{ij}, z_{ij}\}$ coordinates of that respective point in the matrix. In some embodiments, the value of the quality parameter provides a best estimate of the expected error in the $\{x_{ij}, y_{ij}, z_{ij}\}$ values at that point.

The quality parameter may be defined in one of a number of different ways, depending on the particular technique used to capture the image data in the respective input point cloud. In one example discussed in more detail below, a structured illumination approach is employed to acquire the image data from which the output point cloud is computed; in this case, the value of the quality parameter for a given point may, for example, be derived from a degree of contrast seen at that point on the object's surface as the light and dark fringes in the structured illumination pattern are projected on it. In other words, the quality parameter may be related to or derived from the difference in the amount of light detected from that point when illuminated by a light fringe in the illumination pattern and the amount of light detected from that point when illuminated by a dark fringe. In some embodiments, a series of sinusoidally modulated intensity patterns may be projected on to the object, with the intensity patterns in the successive images being phase shifted with respect to one another; here, the quality parameter may be related to or derived from the intensity measured at each point, as each one of the intensity patterns is projected onto the object.

In another example, if using a time-of-flight system for 3D imaging, the amplitude of the recovered signal at a given point may be compared with a measure of the ambient light in the system in order to derive a value of the quality parameter at that point. In a further example, if using a stereo-imaging system, the quality parameter may be obtained by comparing and matching features identified in an image captured on a first camera with features identified in an image captured on a second camera, and determining a score for the quality of the match. The score might be computed, for example, as a sum of absolute differences (SAD):

$$SAD(r, c, x, y) = \sum_{(a,b)}^{(A,B)} |I_1(r+a, c+b) - I_2(r+a+x, c+b+y)|$$

where (r,c) are the image pixel coordinates, $I_1, I_2$ is the stereo image pair, (x,y) is the disparity that SAD is evaluated for, and (A, B) are the dimensions (in number of pixels) of the array over which the matching is carried out. The disparity estimate (x', y') is found for pixel (r, c) using (x',y')=argmin$_{x,y}$ SAD(r,c,x,y). Depending on the estimated SAD value, this can be then further interpreted as a measure of the uncertainty in the 3D coordinates at each point in a reconstructed point cloud based on the stereo images. If desirable, the SAD could be normalized towards e.g. regional image intensity to improve performance.

Regardless of which particular imaging method is used to acquire the input point cloud data, the quality parameter can be used to determine the extent to which the values for the spatial coordinates in each respective input point cloud are taken into consideration when deriving the coordinate values of points in the output point cloud. For example, for a given element $\{i, j\}$ in the output point cloud matrix, the set of coordinate values $\{x_{ij}, y_{ij}, z_{ij}\}$ for that point may be derived by applying a respective weighting to each set of coordinate values $\{x_{ij}, y_{ij}, z_{ij}\}$ at the same position $\{i, j\}$ in the input point cloud matrices. The weighting applied in each matrix may be dependent on the value of the quality parameter $q_{ij}$ at that position in the respective matrix. In this way, the values $\{x_{ij}, y_{ij}, z_{ij}\}$ in the output point cloud matrix can be biased towards values obtained from the image data set(s) having a higher SNR at the point in question.

In another example, the set of coordinate values $\{x_{ij}, y_{ij}, z_{ij}\}$ for the element $\{i, j\}$ in the output point cloud matrix may be chosen by selecting the $\{x_{ij}, y_{ij}, z_{ij}\}$ values from a single one of the input cloud matrices. The input point cloud matrix from which the values are selected may be the one having the highest value of q at that point, compared with the other input matrices.

In another example, for a given element $\{i, j\}$ in the output point cloud matrix, the set of coordinate values $\{x_{ij}, y_{ij}, z_{ij}\}$ for that point may be derived by averaging the respective sets of coordinate values $\{x_{ij}, y_{ij}, z_{ij}\}$ that lie at the position $\{i, j\}$ in the input point cloud matrices. That is, the value $x_{ij}$ in the output point cloud matrix may comprise an average of each one of the values $x_{ij}$ at the point $\{i, j\}$ in the respective input point cloud matrices, the value $y_{ij}$ in the output point cloud matrix may comprise an average of each one of the values $y_{ij}$ at the point $\{i, j\}$ in the respective input point cloud matrices and the value $z_{ij}$ in the output point cloud matrix may comprise an average of each one of the values $z_{ij}$ at the point $\{i, j\}$ in the respective input point cloud matrices. The averaging may be subject to a threshold criterion, whereby only those values for which the associated q value is above a threshold are used in calculating the average value. So, for example, if the values $\{x_{ij}, y_{ij}, z_{ij}\}$ in an element of one of the input point cloud matrices are accompanied by a q value that is below the threshold, the values $\{x_{ij}, y_{ij}, z_{ij}\}$ in that element may be disregarded for the purpose of calculating the values $\{x_{ij}, y_{ij}, z_{ij}\}$ to be used in the output point cloud matrix.

It will be understood that the thresholding criterion may also be applied in the other scenarios described above; for example, if computing the values $\{x_{ij}, y_{ij}, z_{ij}\}$ for an element $\{i, j\}$ in the output point cloud matrix by applying a respective weighting to the sets of coordinate values $\{x_{ij}, y_{ij}, z_{ij}\}$ at the same position $\{i, j\}$ in the point cloud matrices of the input matrices, a zero weighting may be applied to those sets of coordinate values $\{x_{ij}, y_{ij}, z_{ij}\}$ that are accompanied by a q value that is below the threshold.

BRIEF DESCRIPTION OF DRAWINGS

Embodiments of the invention will now be described by way of example with reference to the accompanying drawings in which.

DETAILED DESCRIPTION

Figure 4:
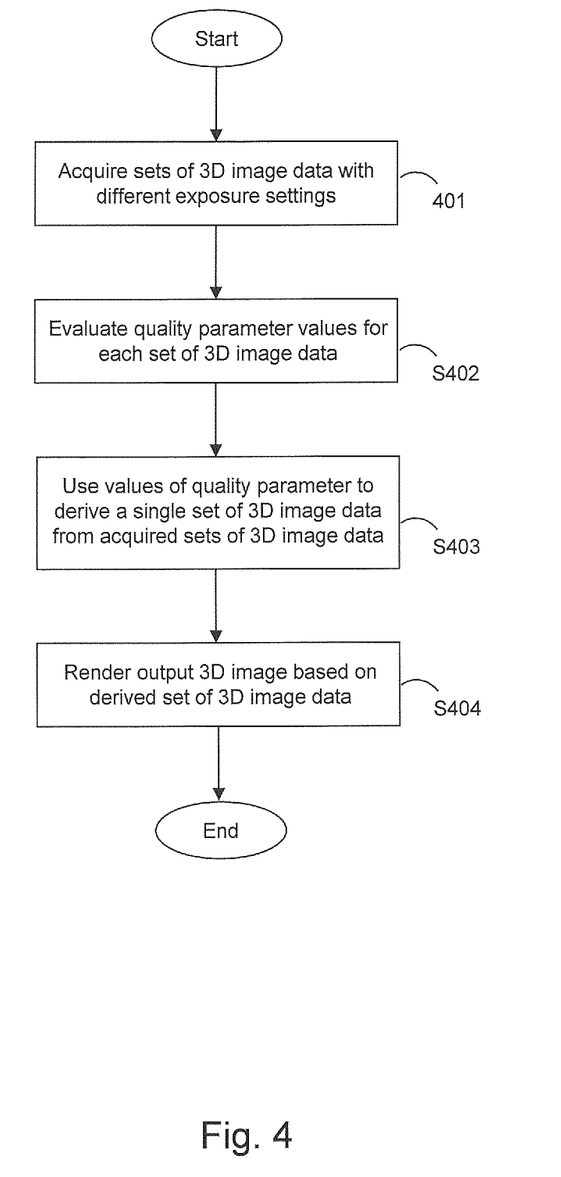
FIG. 4 shows a flow-chart of steps in an embodiment described herein.

FIG. 4 shows a flow-chart of steps carried out in embodiments described herein. In a first step S401, a plurality of sets of 3D image data are acquired by an imaging system. Each set of 3D image data can be used to compute a respective input point cloud that defines the 3D coordinates of different points on the surface of an object being imaged, together with a value for the intensity or brightness level of the surface at each point.

In step S402, the value of a quality parameter is evaluated for the data associated with each point in each one of the respective input point clouds. As discussed above, the value of the quality parameter comprises a measure of the uncertainty in the three-dimensional co-ordinates at each point. The quality parameter may be computed as a function of the acquired intensity values that are used to calculate the spatial coordinates at each point in the respective input point clouds.

In step S403, a single output set of 3D image data is computed based on the image data contained in each one of the acquired sets of image data. In common with the acquired image data sets, the output set of image data defines values for the 3D coordinates of different points on the surface of the object being imaged, together with the intensity or brightness level of the surface at each point. Here, the values for the 3D coordinates are computed by weighting the values for the 3D coordinates specified in the respective input point clouds, in accordance with their respective quality parameter values. The output image data set can then be used to render a 3D image of the object (step S404).

An example embodiment using a structured light illumination method to acquire 3D image data will now be described with reference to FIGS. 5 to 7.

Figure 5:
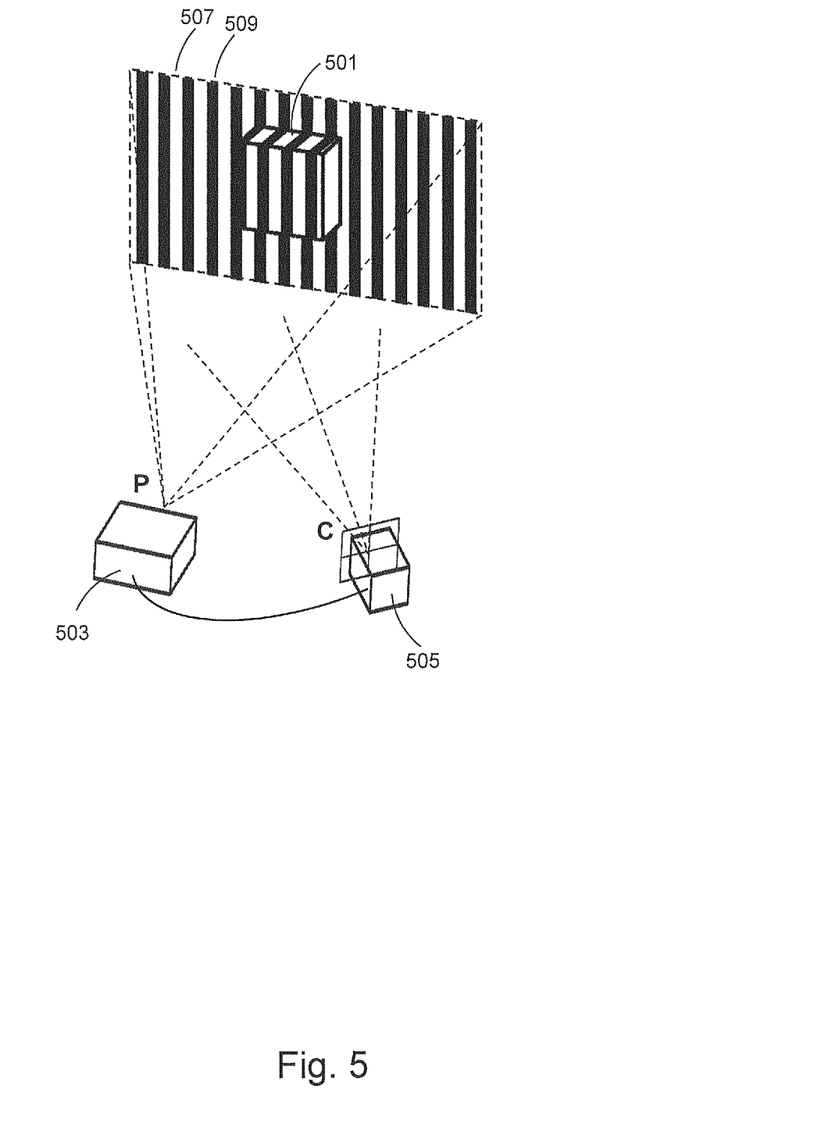
FIG. 5 shows a schematic of a structured illumination imaging system in an embodiment.
Figure 6:
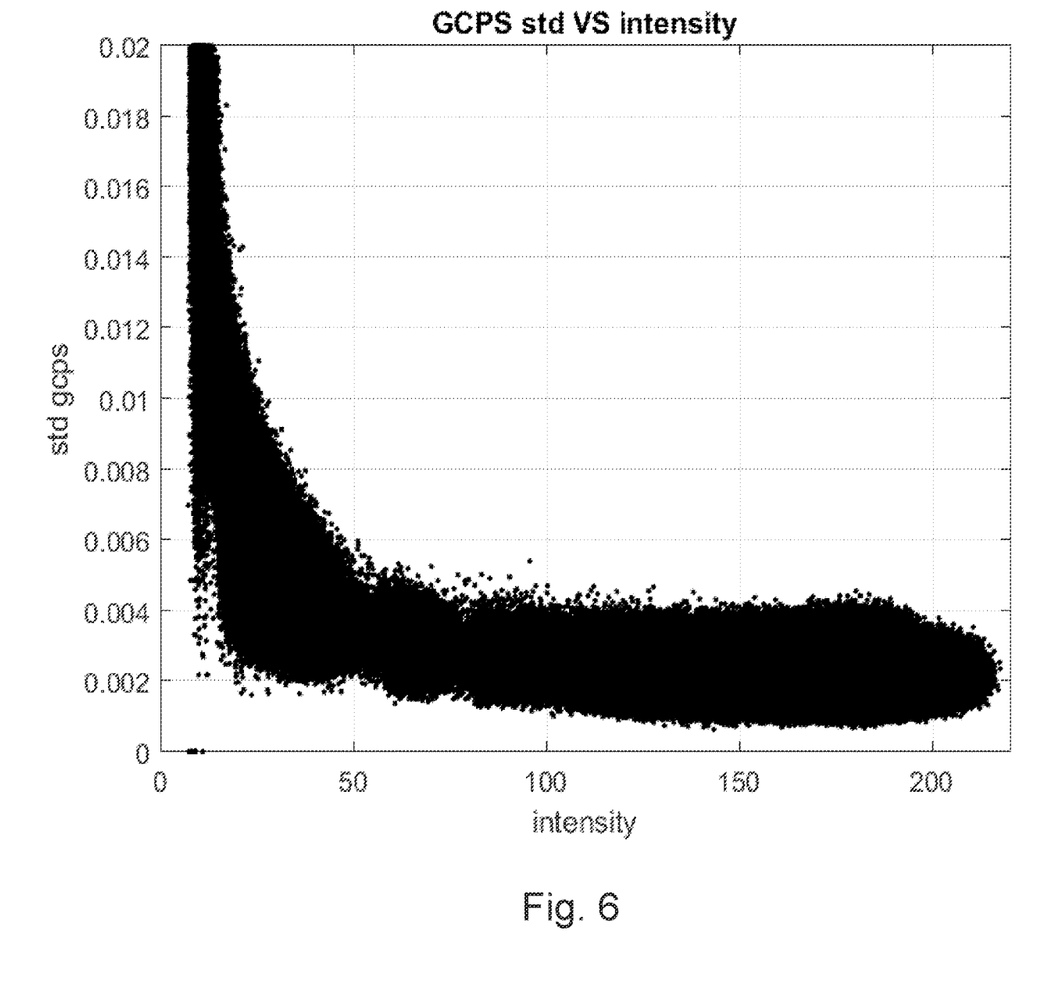
FIG. 6 shows an example of how the standard deviation in a GCPS value may vary as a function of signal amplitude, in an embodiment in which a combination of Gray-coding and phase shifting is used to recover 3D spatial information from an object.

Referring to FIG. 5, there is shown a schematic of a system suitable for capturing 3D images of an object 501 using structured light illumination. The system comprises a projector 503 and a camera 505. The projector is used to project a spatially varied 2D illumination pattern onto the object 40. The pattern itself comprises a series of light and dark fringes 507, 509. The pattern may be generated using a spatial light modulator, for example. The camera 505 is used to acquire a 2D image of the object as illuminated by the projector.

Owing to the angle between the camera and the projector, any variations in the surface topology of the object will cause the pattern of light and dark fringes, as detected by the camera, to become distorted. By corollary, the distortion in the pattern will encode information about the 3D surface of the object, and can be used to deduce its surface topology. The 3D information can be recovered by capturing sequential images in which the object is illuminated with different patterns of light, and comparing the measured intensity for each pixel across the sequence of images.

In the present embodiment, a phase shifting technique is used to obtain the 3D information. Phase shifting is a well-known technique in which a sequence of sinusoidally modulated intensity patterns is projected onto the object, with each pattern being phase shifted with respect to the previous one. A 2D image of the illuminated object is captured each time the intensity pattern is changed. Variations in the surface topology of the object will give rise to a change in the phase of the intensity pattern as seen by the camera at different points across the surface. By comparing the intensities of light in the same pixel across the sequence of 2D images, it is possible to compute the phase at each point, and in turn use this to obtain depth information about the object. The data is output as a 2D array, in which each element maps to a respective one of the pixels of the camera, and defines the 3D spatial coordinates of a point as seen in that pixel.

It will be appreciated that other techniques, besides phase shifting, may also be used to recover the 3D spatial information; for example, in some embodiments, a Gray-coding technique may be used, or a combination of Gray-coding and phase shifting. The precise algorithms used to decode the 3D spatial information from the sequence of 2D images will vary depending on the specific illumination patterns and the way in which those patterns are varied across the sequence of images; further information on algorithms for recovering the depth information using these and other techniques is available in the publication "Structured light projection for accurate 3D shape determination" (O. Skotheim and F. Couweleers, ICEM12—12$^{th}$ International Conference on Experimental Mechanics 29 Aug.-2 Sep., 2004, Politecnico di Bari, Italy). In each case, the 3D spatial information in the object is computed by considering the variation in intensities at each point on the object as the illumination pattern changes and the points are exposed to light and dark regions of the pattern.

In one example, in which a combination of Gray-coding and phase shifting is used to recover the 3D spatial information, the projector is used to project a series of both Gray-code and phase-shifted patterns onto the object. (Further details of such a method can be found, for example, in an article by Giovanna Sansoni, Matteo Carocci and Roberto Rodella, entitled "Three-dimensional vision based on a combination of Gray-code and phase-shift light protection: analysis and compensation of the systematic errors"—Applied Optics, 38, 6565-6573, 1999). Here, for each point on the object, two corresponding pixel positions can be defined: (i) the projector pixel coordinate i.e. a pixel position in the projector from which the light that is incident on that point on the object is emanating, and (ii) the camera pixel coordinate i.e. the pixel position in the camera at which the light reflected by that point on the object is captured. Using a suitable algorithm, and taking into account the relative positions of the camera and projector (these relative positions being determined straightforwardly using a standard calibration measurement), the images captured at the camera can be processed in order to determine, for each camera pixel, the corresponding projector pixel coordinate. In effect, a determination can be made as to which projector pixel a particular camera pixel is "looking at". Moreover, by combining the image data received from the Gray-code patterns and phase shifted patterns, the projector pixel coordinate can be determined with higher resolution than the projector pixels themselves.

The above methodology can be understood as follows. First, by choosing a number of N Gray code patterns, and setting the number of sinusoidal fringes in the phase shifting patterns to $2^N$, the fringes can be aligned with the binary transitions in the sequence of N Gray code patterns. The resulting Gray code words, GC(i, j) and the values obtained for the phase, $\phi(i,j)$, can be combined to form a set of "GCPS" values that describe the absolute fringe position in each position in the field of view. The GCPS values can in turn be used to determine the projector pixel coordinates by performing a scaling of the values from a minimum/maximum of the code to the width ($w_p$) and height ($h_p$) of the projector image; in effect, one is able to measure the "fringe displacement" by estimating the phase of the sine patterns in every pixel in the camera.

Next, it is possible to define:

$$\alpha(i, j) = GCPS_v(i, j) = GC_v(i, j) + \frac{1}{2\pi}\phi_v(i, j)$$

where, $GC_v(i, j)$ is the result of the Gray code measurements and $\phi_v(i,j)$ is a result of the phase stepping measurements, both performed with vertical fringes. (As before, the indices i,j refer to the pixel elements of the image sensor). From the equation above, it is then possible to calculate the originating subpixel projector column for each pixel in the camera image:

$$P_c(i,j) = 0.5 + (w_p - 1)\frac{\alpha(i,j) - \alpha_{min}}{\alpha_{max} - \alpha_{min}}$$

where $\alpha_{max}$ and $\alpha_{min}$ are the maximum and minimum values for the GCPS code for vertical fringes. Similarly, when obtaining GCPS values using horizontal fringes, it is possible to define:

$$\beta(i,j) = GCPS_h(i,j) = GC_h(i,j) + \frac{1}{2\pi}\phi_h(i,j)$$

Then, using the equation for $\beta(i,j)$, it is possible to calculate the originating subpixel projector row for each pixel in the camera image by:

$$P_r(i,j) = 0.5 + (h_p - 1)\frac{\beta(i,j) - \beta_{min}}{\beta_{max} - \beta_{min}}$$

where $\beta_{max}$ and $\beta_{min}$ are the maximum and minimum values for the GCPS code for horizontal fringes.

Having obtained the subpixel projector column and row coordinates $P_c(i,j), P_r(i,j)$, those values can be used to obtain the {x,y,z} coordinates of points on the object being imaged; specifically, for a given camera pixel p, which is established to be receiving light from a point on the projector g, a position estimate E of a point on the object having coordinates $\{x_{ij}, y_{ij}, z_{ij}\}$ can be derived by using known triangulation methods, akin to those used for stereo vision, taking into consideration the lens parameters, distance between the camera and projector etc.

The uncertainty in each GCPS value will be largely influenced by the amplitude of the recovered signal and to a lesser degree the presence of ambient light. Experiments carried out by the inventors have shown that the uncertainty in the GCPS value is typically fairly constant until the amplitude of the received signal drops beneath a certain level, after which the uncertainty increases nearly exponentially; this means that the measured amplitude and ambient light can be translated through a pre-established model into an expected measurement uncertainty of the GCPS value— an example is provided in FIG. 6, which shows the standard deviation (std) in the GCPS value as a function of intensity. By using the same calculation as used to obtain the position estimate E above, but now taking the projector pixel position to be g+Δg, where Δg is derived from the standard deviation in the GCPS value at the detected signal amplitude, it is possible to obtain a new position estimate E'. An estimated standard deviation LE in the position measurement E can then be derived by assuming that ΔE=|(|E−E'|)|. The estimate ΔE can then be used to define the quality parameter.

It will be clear that regardless of precisely which algorithm is used for the structured illumination, in order to compute the 3D spatial information with high accuracy, it will be desirable to measure the variation in intensity at each point on the object with maximal signal to noise; this in turn requires that the contrast in intensity that is seen as a particular point is alternatively exposed to light and dark regions of the illumination pattern should be as high as possible. In line with the earlier discussion, the extent of contrast at a particular point may be limited by the need to accommodate a large range of intensities across the surface of the object; if the surface of the object itself comprises a number of bright and dark regions, then given the finite dynamic range of the camera, it may not be possible to maximize the signal recovered from dark regions of the object's surface without also incurring saturation effects where brighter regions of the object are exposed to the brighter fringes in the illumination pattern. It follows that it may not be possible to optimize the contrast in the intensities seen at every point on the surface in a single exposure (in this context, an "exposure" will be understood to refer to the capture of a sequence of 2D images from which a respective point cloud can be computed).

In order to address the above problem, in embodiments described herein, a number of exposures are taken using different settings. An example of this is shown pictorially in FIG. 7. To begin with, a first sequence of 2D images is captured using a first set of exposure settings. In the present example, the exposure settings are varied by altering the relative size of the camera aperture, although it will be appreciated that the exposure settings may also be varied by adjusting one or more other parameters of the imaging system. The circle 701 shows the relative size of the camera aperture as used to capture the first sequence of images, and the patterns 703a, 703b, 703c show the illumination patterns that are projected onto the object when capturing the respective images in the first sequence of images. As can be seen, each illumination pattern 703a, 703b, 703c comprises a sinusoidally modulated intensity pattern in which a series of alternatively light and dark fringes are projected on to the object. The phase of the pattern across the field of view is illustrated schematically by the wave immediately beneath each pattern, with the dark fringes in the pattern corresponding to the troughs in the wave, and the bright fringes corresponding to the peaks in the wave. As can be seen, the illumination patterns in the successive images are phase shifted with respect to one another, with the positions of the bright and dark fringes in each pattern being translated with respect to one another. A suitable algorithm is used to compare the intensities of light in the same pixel across the sequence of 2D images, in order to compute the depth information at that point. The three-dimensional spatial information is then stored, together with the intensity value for each point, in a first point cloud matrix 705.

In addition to the three-dimensional coordinates {x, y, x} and intensity values I, each element in the point cloud matrix 705 includes a value for the quality parameter q, as shown in FIG. 3 earlier. In the present embodiment, the value q is determined based on the standard deviation of the observed intensities in the respective camera pixel $I_n$ (i,j) seen as the three different illumination patterns 703a, 703b, 703c are projected on the object. In another embodiment, the value q is determined based on the difference between the maximum value of intensity and minimum intensity in that pixel across the sequence of images. In this way, the quality parameter defines a measure of the contrast seen in each pixel across the sequence of images.

In the next stage of the process, the exposure settings are adjusted by expanding the size of the camera aperture, as reflected by the circle 707, thereby increasing the amount of light from the object that will reach the camera. A second sequence of 2D images is captured, with the illumination patterns 709a, 709b, 709c again being varied for each image in the sequence. The second sequence of 2D images is used to compute a second input 3D image point cloud 711 that records the depth information for each element, together with an intensity value and a value for the quality parameter q. Owing to the difference in exposure between the first sequence of images and the second sequence of images, it is likely that the degree of contrast seen in a given pixel element {i, j} will vary across the two sequences of images; for example, the difference between the maximum intensity level and minimum intensity level detected in a given pixel element {i, j} will vary between the two sets of images. Accordingly, the values of q recorded in the first point cloud matrix 705 will likely differ from the values of q in the second point cloud matrix 711.

In a further step, the exposure settings are further adjusted by expanding the size of the camera aperture as shown by circle 713. A third sequence of 2D images is captured on the camera, with the illumination patterns 715a, 715b, 715c being projected onto the object. The third sequence of 2D images is used to compute a third input 3D image point cloud matrix 717, which again records the depth information for each element, together with an intensity value and a value for the quality parameter q. As in the case of the first and second point cloud matrices, the difference in exposure between the second sequence of images and the third sequence of images means that it is likely that the degree of contrast seen in the same pixel element {i, j} will vary across the second and third sequences of images. Thus, the values of q recorded in the third point cloud matrix 717 will likely differ from both the first point cloud matrix 705 and the second point cloud matrix 711.

Having computed the point cloud matrices for each sequence of images, the method proceeds by using the data in the respective point cloud matrices to compile a single output point cloud matrix 719, which can then be used to render a 3D representation of the object.

Figure 7:
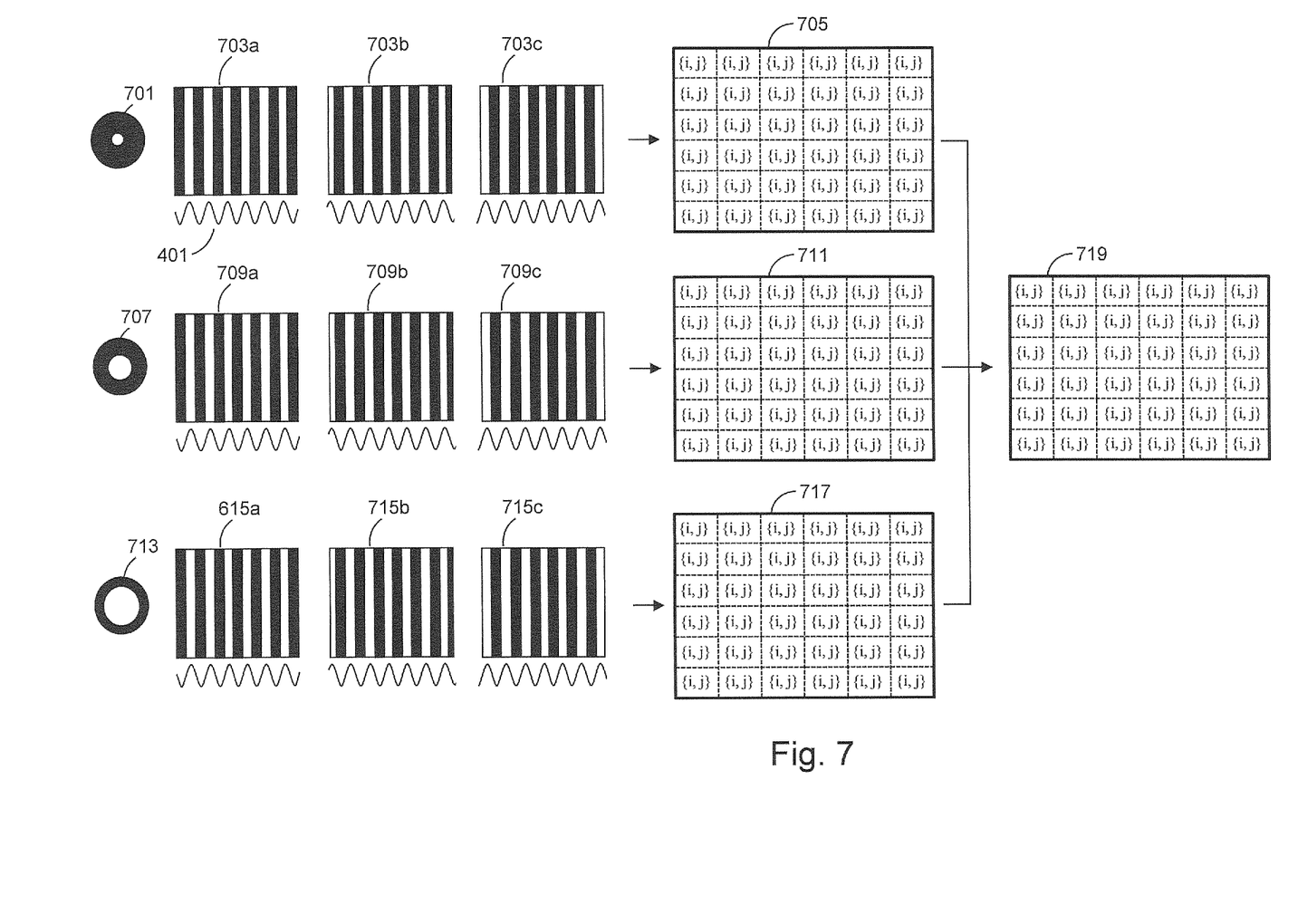
FIG. 7 shows a schematic of how multiple input point cloud matrices may be obtained using the imaging system of FIG. 5 and used to generate a single output point cloud matrix.

It will be understood that, whereas the example shown in FIG. 7 includes a total of three input sequences of images, this is by way of example only and the output point cloud matrix may be computed by capturing any number N of point clouds, where N>=2. Similarly, whilst in the above described example the exposure was varied by increasing the size of the camera aperture in-between capturing each sequence of images, it will be readily understood that this is not the only means by which the exposure may be varied—other examples of ways in which the exposure may be varied include increasing the illumination intensity, increasing the camera integration time, increasing the camera sensitivity or gain, or by varying the strength of an neutral density filter placed in the optical path between the object and the camera.

By capturing multiple 3D images at different exposure settings, and combining the data from those data sets to provide a single output 3D image, embodiments as described herein can help to compensate for the limits in dynamic range of the camera, providing an enhanced signal to noise ratio for both darker and brighter points on the object surface. In so doing, embodiments can help to ensure that useable data is captured from areas that would, if using conventional methods of 3D surface imaging, be either completely missing from the final image or else dominated by noise, and can ensure that the surface topography of the object is mapped with greater accuracy compared with such conventional methods of 3D surface imaging.

Figure 8:
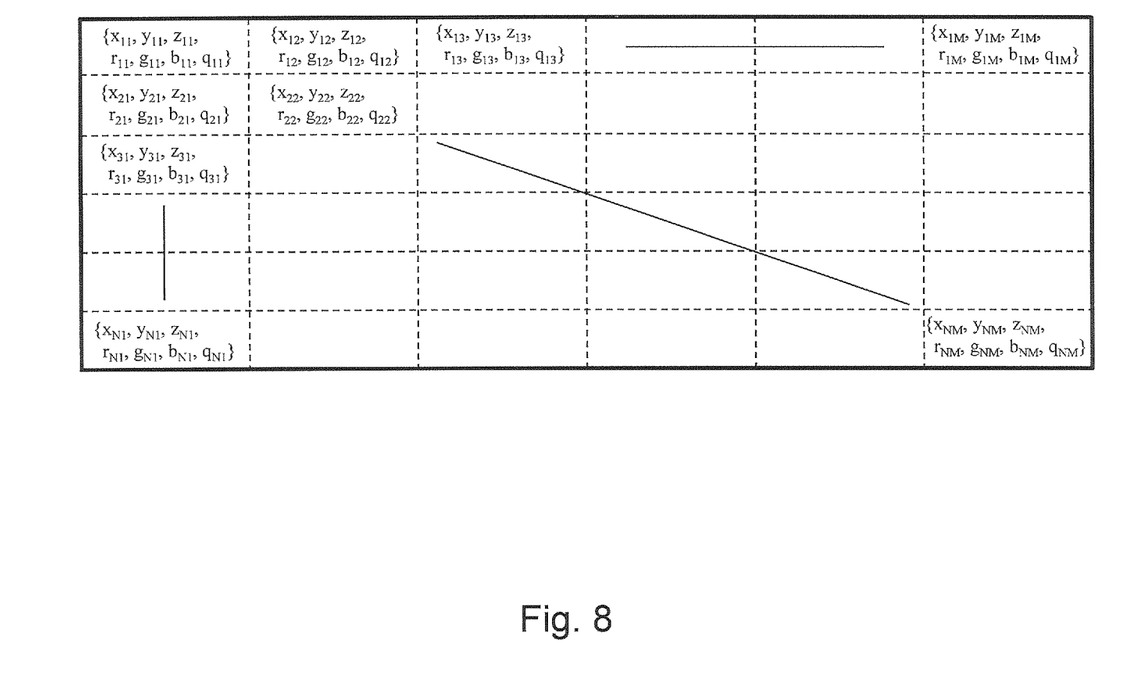
FIG. 8 shows an example of a point cloud matrix in an embodiment described herein.

In the embodiments described above, it has been assumed that the camera sensor is imaging in grayscale; that is, a single intensity value is measured in each pixel, relating to the total light level incident on the sensor. However, it will be understood that embodiments described herein are equally applicable to color imaging scenarios. For example, in some embodiments, the camera sensor may comprise an RGB sensor in which a Bayer mask is used to resolve the incident light into red, green and blue channels; in other embodiments, the camera sensor may comprise a three-CCD device in which three separate CCD sensors are used to collect the respective red, blue and green light signals. In this case, the point cloud matrices will be acquired in the same manner as in the above described embodiments, but within each matrix element, the intensity values $I_{ij}$ will be decomposed into the three colour intensities $r_{ij}$, $g_{ij}$, $b_{ij}$. FIG. 8 shows an example of such a point cloud matrix.

It will be appreciated that implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A method for generating a three-dimensional image of an object, the method comprising:
receiving a set of input point cloud data from an imaging system used to image the object, wherein the set of input point cloud data comprises two or more point clouds, each point cloud defining x, y, and z coordinates of points on the surface of the object, wherein the data in each input point cloud is computed from a respective set of image data acquired by the imaging system, each set of image data being acquired using a different exposure setting for the imaging system;
determining, for each point in the respective input point clouds, a value of a quality parameter, wherein the value of the quality parameter for a respective point reflects a degree of uncertainty in each of the x, y, and z coordinates as specified for that point in the point cloud, the quality parameter being computed as a function of one or more values in the acquired image data used to calculate the x, y, and z coordinates at the respective point;

identifying groups of points from the set of input point cloud data, wherein each group comprises a point from each input point cloud;

generating an output point cloud for generating a 3D representation of the object surface, wherein the output point cloud defines the x, y, and z coordinates of points on the surface of the object, wherein, for each point in the output point cloud, the x, y, and z coordinates of the respective point are computed based on the x, y, and z coordinate values of the points in a respective one of the identified groups of points, wherein the extent to which the x, y, and z coordinate values of each respective point in the group are taken into consideration in the computation is determined based on the values of the quality parameter associated with the respective point;

the method comprising rendering a three-dimensional image of the object based on the data in the output point cloud.

2. A method according to claim 1, wherein the imaging system is an optical imaging system comprising a light sensor.

3. A method according to claim 2, wherein the data in each input point cloud is computed from one or more 2D images of the object as captured on the light sensor.

4. A method according to claim 2, wherein the exposure setting used to acquire each set of image data is varied by altering one or more of:
the sensor integration time;
the sensor sensitivity;
the size of an aperture stop in the path between the object and the sensor;
an intensity of light used to illuminate the object; and
the strength of an ND filter placed in the light path between the object and the sensor.

5. A method according to claim 2, wherein the data in each input point cloud is stored as a respective two dimensional point cloud matrix, wherein each element in the matrix contains the x, y, and z coordinates of a respective point, the intensity value for the point, and the value of the quality parameter for that point;
wherein the points in each group are identified as ones having the same element position in the respective input point cloud matrices.

6. A method according to claim 5, wherein the light sensor comprises a two dimensional pixel array, and the matrix elements are mapped to respective pixel elements in the array.

7. A method according to claim 6 wherein the imaging system is one that uses structured illumination to obtain each set of image data.

8. A method according to claim 7, wherein each set of image data comprises a sequence of 2D images of the object as captured on the light sensor, each 2D image in the sequence being captured using a different illumination pattern, the images in the sequence being used to compute the input point cloud matrix for the respective exposure setting.

9. A method according to claim 8, wherein for each input point cloud matrix, the quality parameter for each element in the input point cloud matrix comprises a measure of contrast seen in the corresponding pixel across the sequence of images.

10. A method according to claim 8, wherein for each input point cloud matrix, the quality parameter for each element in the input cloud matrix is computed based on the standard deviation in intensity seen in the corresponding pixel across the sequence of images.

11. A method according to claim 8, wherein for each input point cloud matrix, the quality parameter for each element in the input cloud matrix is computed based on the difference between the maximum and minimum brightness in intensity seen in the corresponding pixel across the sequence of images.

12. A method according to claim 8, wherein for each input point cloud matrix, the quality parameter for each element in the input cloud matrix is computed based on a modelled error in the 3D coordinates at that point, the error being modelled as a function of the intensity seen in the corresponding pixel across the sequence of images.

13. A method according to claim 12, wherein each set of image data comprises a sequence of Gray-coded images and a sequence of phase shifted images,
wherein the data from the sequence of Gray-coded images and phase shifted images is combined to derive, for each pixel element, a value from which the coordinates of a respective point in the point cloud are computed,
wherein the error in the coordinates at each point in the point cloud is modelled as a function of the error in the value computed for the respective pixel element.

14. A method according to claim 1, wherein each input point cloud comprises colour information for each point.

15. A method according to claim 14, wherein the colour information is encoded as RGB values.

16. A non-transitory computer readable storage medium comprising computer executable code that when executed by a computer will cause the computer to carry out a method according to claim 1.

17. A system for generating a three-dimensional image of an object, the system comprising:
a sensor for acquiring image data from the object;
a controller for varying the exposure of the sensor, the sensor being configured to acquire respective sets of image data at different exposures; and
a processor for processing the acquired image data, wherein for each set of image data, the processor is configured to generate an input point cloud, the point cloud defining x, y, and z coordinates of points on the surface of the object and an intensity value at each point,
the processor being further configured to:
determine, for each point in the respective input point clouds, a value of a quality parameter, wherein the value of the quality parameter for a respective point reflects a degree of uncertainty in each one of the x, y, and z coordinates as specified for that point in the point cloud, the quality parameter being computed as a function of one or more values in the acquired image data used to calculate the x, y, and z coordinates at the respective point;
identify groups of points from the set of input point cloud data, wherein each group comprises a point from each input point cloud; and
generate an output point cloud for generating a 3D representation of the object surface, wherein the output point cloud defines the x, y, and z coordinates of points on the surface of the object and an intensity value at each point,
wherein, for each point in the output point cloud, the x, y, and z coordinates of the respective point are computed based on the x, y, and z coordinate values of the points in a respective one of the identified groups of points, wherein the extent to which the x, y, and z coordinate values of each respective point in the group are taken into consideration in the computation is determined based on the values of the quality parameter associated with the respective point, and to render a three-dimensional image of the object based on the data in the output point cloud.

* * * * *